May 17, 1960 J. T. GONDEK 2,937,038
PRESSURE PIPE FITTINGS
Filed April 19, 1956 2 Sheets-Sheet 1

INVENTOR
John T. Gondek
BY Robert M. Dunning
ATTORNEY

May 17, 1960   J. T. GONDEK   2,937,038
PRESSURE PIPE FITTINGS
Filed April 19, 1956   2 Sheets-Sheet 2

INVENTOR
John T. Gondek
BY Robert M. Dunning
ATTORNEY

United States Patent Office 2,937,038
Patented May 17, 1960

2,937,038

PRESSURE PIPE FITTINGS

John T. Gondek, Minneapolis, Minn.

Application April 19, 1956, Serial No. 579,311

1 Claim. (Cl. 285—323)

This invention relates to an improvement in pressure pipe fittings useful in eliminating flaring, threading, welding or soldering in a pressure pipe connection.

Various types of connections have been produced for use in connecting a pipe or tube designed to accommodate fluid under pressure. In many instances the tube is flared at its extremity and the fitting is provided with cooperable parts to clamp the flared end of the tube. In other instances the pipe is threaded into the fitting. In some cases the pipe is welded to the fitting to insure a tight seal. In still other cases, as is common in the use of copper tubing and the like, the tube is soldered into the fitting. All of these fittings have certain disadvantages. For example, special equipment is usually necessary to complete the joint in the event the pipe is flared, welded or soldered into place. Threaded connections have the difficulty of leaking when subjected to high pressure. An object of the present invention is to avoid these previous difficulties and to provide a fitting which will withstand high pressures and which may be attached without the use of special tools.

A feature of the present invention resides in the provision of a fitting which is so arranged that the joint between the pipe and the fitting is more firmly held when subjected to pressure. The fitting includes tapered jaws which encircle the pipe and which are enclosed within an internally tapered portion of the fitting. Any pressure tending to pull the pipe or push the pipe from the fitting causes these jaws to grip more firmly about the pipe. Thus the effectiveness of the connection is actually increased when the pipe is subjected to pressure.

A further feature of the present invention resides in the provision of a fitting equipped with angularly spaced jaws having grooves on their inner surface somewhat similar to threads. Means is provided for compressing these jaws against the pipe so that the ridges between the grooves engage firmly against the surface of the pipe or may actually extend into the pipe. Thus the jaws firmly grip the pipe and move therewith when any tendency is provided to withdraw the pipe from the fitting.

A further feature of the present invention resides in the provision of a pipe fitting having a series of angularly spaced jaws of triangularly or wedge-shaped cross section which are designed to cooperate with tapered interior portions of the fitting so that the jaws will wedge tightly against the pipe when moved longitudinally or axially of the fitting in one direction. An independent seal is provided engageable with the extremity of the pipe inwardly of the jaws, this seal forming the actual fluid seal between the pipe and the fitting. The compression of the jaws about the pipe acts to mechanically hold the pipe from longitudinal movement relative to the fitting.

An added feature of the present invention resides in the provision of a pipe fitting having a series of angularly spaced jaws which may be wedged against the outer surface of the pipe upon longitudinal movement of the jaws relative to the body of the fitting and in providing means for moving the jaws so as to provide an initial clamping action between the jaws and the pipe. Longitudinal movement of the pipe due to the forces of pressure within the fitting merely tightens this mechanical connection between the fitting and the pipe.

An added feature of the present invention resides in the provision of a fitting which may be attached to the end of a pipe and including means for detachably connecting the fitting to the pressure housing or other member to which the fitting may be attached. The fitting is detachably connected in such a way that, if desired, the fitting may be disconnected from the member to which it is attached without disturbing the seal between the pipe and the fitting.

These and other objects and novel features of the present invention will be more clearly and fully set forth in the following specification and claim.

In the drawings forming a part of the specification:

Figure 1:
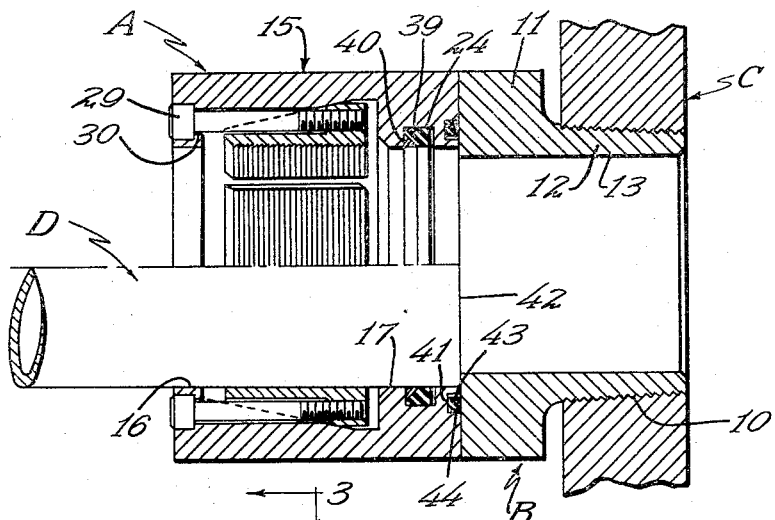
Figure 1 is an elevational view showing the general arrangement of parts thereof.

Figure 1 of the drawings shows a fitting indicated in general by the letter A and provided with an adapter B designed to extend into a suitable threaded opening 10 in a housing or other member C. The housing C may be of any shape or design and may comprise a part of a hydraulic pump, a part of a hydraulic cylinder, or any other member in which or from which fluid under pressure is to flow. In actual practice, the adapter B may be eliminated and the fitting A may be attached directly to the member C.

The adapter B is shown as being provided with a generally rectangular mounting flange 11 having a projecting sleeve 12 extending therefrom. This sleeve 12 is usually externally threaded as indicated and is provided with an axial passage 13 extending therethrough. In the event the adapter B is eliminated, the body of the fitting is merely held in surface contact with the member C by bolts or other similar means which will be later described.

Figure 3:
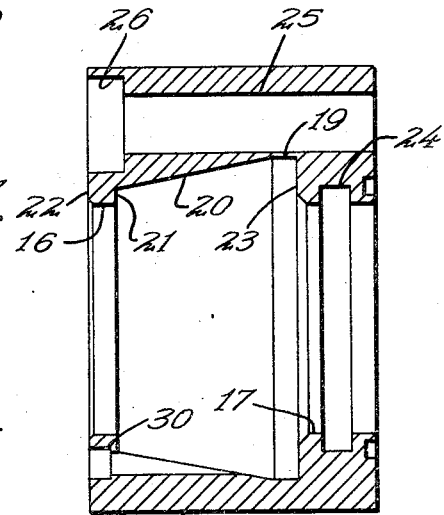
Figure 3 is a cross sectional view through the body of the fitting with the jaws removed, the position of the section being indicated by the line 3—3 of Figure 2.
Figure 4:
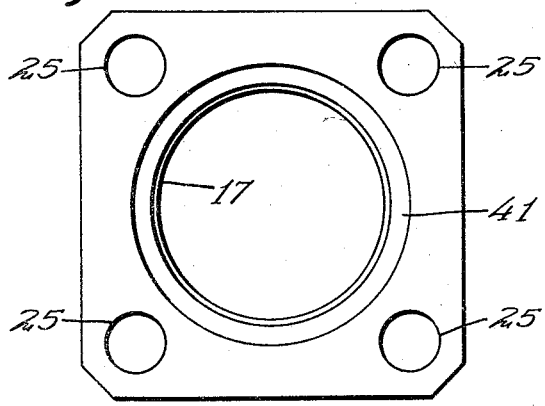
Figure 4 is an end elevational view of the body of the fitting illustrated in Figure 3.

The body of the fitting A is constructed as is best illustrated in Figures 3 and 4 of the drawings, this fitting body being indicated in general by the numeral 15. One end of the body 15 is provided with an axial opening 16 therein, the opposite end of the body 15 is also provided with an opening 17 of similar diameter. Between the ends 16 and 17 the body of the fitting is undercut so that the diameter of the openings 16 and 17 is less than the diameter of the intermediate portion of the fitting body. Adjoining the interior end of the passage 17 I provide an undercut portion 19 having a generally cylindrical surface which is of substantially larger diameter than the diameter of the passage 17. From this cylindrical undercut portion 19 to the inlet passage 16 the interior surface of the fitting body is tapered as indicated at 20, this tapered surface gradually decreasing in diameter from the cylindrical surface portion 19 to a point adjoining the passage 16. A shoulder 21 is provided between the smaller diameter end of the inclined surface 20 and the passage 16.

Thus in effect, the passages 16 and 17 extend through inwardly extending flanges at opposite ends of the fitting body. These flanges are indicated in the drawings by the numerals 22 and 23. The flange 23 is provided with a groove 24 therein intermediate the ends of the passage 17 through this flange. This groove 24 is designed to contain a sealing means which will be later described in detail.

Figure 2:
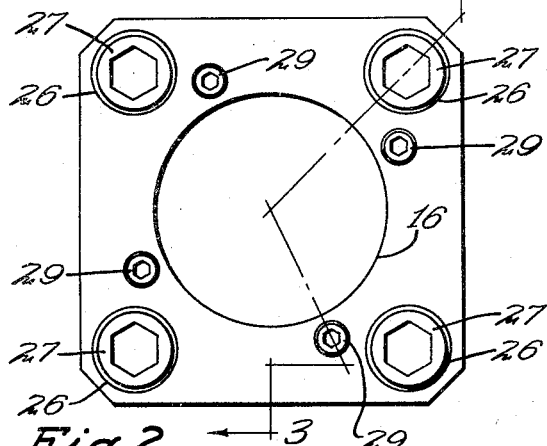
Figure 2 is an end elevational view of the fitting shown in Figure 1.

As was previously stated, the body 15 of the fitting is generally rectangular in form and the corners of the rectangular body are provided with parallel apertures extending therethrough, the ends of these apertures most remote from the adapter B or member C being enlarged as indicated at 26 in Figures 2 and 3 of the drawings to accommodate bolts 27 designed to extend through the apertures 25 to connect the body 15 to the adapter B or to the member C. The member to which the fitting A is attached is provided with suitably threaded apertures into which the bolts 27 extend to clamp the fitting body against the part to which it is attached.

As is also indicated in Figure 2 of the drawings, a series of counter-sunk bolts 29 extend through the end of the fitting in closely spaced relation to the passage 16. One such passage 30 is indicated in Figure 3 of the drawings and a simpler passage or aperture 30 is shown in Figure 1. The bolts 29 are designed to control the initial clamping action of the angularly spaced jaws which will be described in detail.

Figure 5:
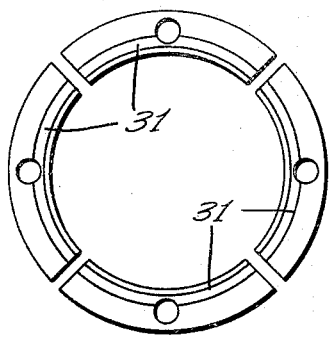
Figure 5 is an end elevational view of the jaws as they appear when removed from the body of the fitting but rearranged in proper angular relationship.
Figure 7:
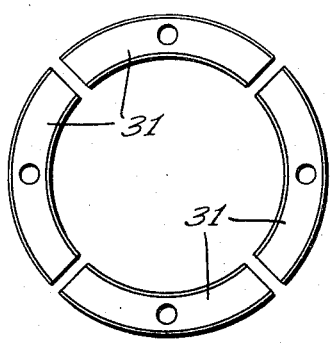
Figure 7 is an end elevational view of the jaws, the view being taken from the side thereof opposite that shown in Figure 5.
Figure 6:
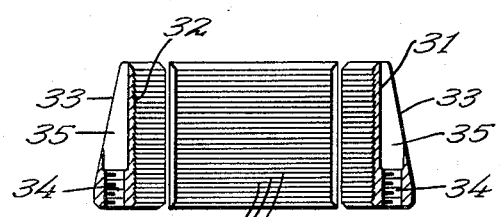
Figure 6 is a sectional view through the fitting illustrated in Figure 5.

With reference now to Figures 5 to 7 of the drawings it will be noted that the jaws 31 are four in number in the particular arrangement illustrated in the drawings although the number of these jaws may be varied. As is shown in Figure 6, the jaws are provided with generally cylindrical inner surfaces 32 and tapered outer surfaces 33. The taper of these outer surfaces 33 is the same as the taper of the inner surface 20 of the fitting body 15. Each of the jaws 31 is provided with an axially extending internally threaded opening 34 which extends through the large diameter end of each jaw. Due to the taper of the jaws and in order to make the structure as compact as possible, the threaded openings 34 cannot extend the full length of the jaws but longitudinally aligned apertures or grooves 35 are provided in the outer tapered surfaces 33 to permit the bolts 30 to extend the entire length of the jaws.

The inner surfaces of the jaws 31 are grooved as indicated at 36. These grooves are preferably provided with an outer wall arranged on a plane normal to the axis of the fitting and the other surface tapering to intersect the normal wall of the next groove. In other words the grooves are shaped in such a manner as to resist outward movement of a pipe such as D supported within the jaws or movement of the pipe D to the left as indicated in Figure 1 of the drawings. A sealing ring 39 is supported in each groove 24. The sealing ring 39 may, if preferred, be a seal of the O-ring type. However, I prefer to employ a reinforced type of ring somewhat similar to that disclosed in my co-pending application for patent for sealing ring and which discloses a generally rectangular body of soft resilient material capable of compressing under pressure equipped with a reinforcing member 40 of generally triangular cross section or angular cross section which is of considerably harder material. The ring portion 40 prevents the softer ring 39 from extruding between the pipe and the wall of the fitting under high pressure. The two rings 39 and 40 may be integrally connected or may be separate.

A groove 41 is provided in the end face 42 of the body 15, this groove encircling the passage 17 and spaced outwardly therefrom. The groove 41 is also designed to enclose a sealing ring 43 to seal the space between the fitting A and the adapter B or member C to which the fitting A is attached. The ring 43 may be provided with an angular reinforcing ring 44 attached thereto or embodied therewith. The reinforcing ring 44 is of a material considerably harder than the resilient material forming the ring 43 and acts to prevent extrusion of the ring 43 when this ring is subjected to pressure.

The operation of my fitting is extremely simple. The fitting may be attached to a pipe either before or after the fitting is connected to the adapter B or member C. The end of the pipe B is inserted through the passage 16 and through the passage 17, extending sufficiently far past the groove 24 so that the sealing rings will be effective. The bolts 29 are next tightened, moving the wedge-shaped jaws toward the shoulder 21 of the flange 22. As the jaws move to the left as viewed in Figure 1, they are urged against the outer surface of the pipe B by the cooperation of the wedge-shaped surfaces. As the jaws move inwardly, the openings in the jaws become slightly misaligned with the openings 30 in the fitting body. However, the misalignment is insufficient to cause structural difficulty and the openings 30 may be large enough to accommodate any lateral movement of the bolts.

It will be seen that the grooves are properly shaped to permit the jaws to be moved to the left over the surface of the pipe but will restrict a reverse movement of the jaws relative to the pipe. Accordingly, the jaws may be moved forwardly to grip the surface of the pipe tightly and firmly clamp the pipe in place.

When the interior of the fitting is subjected to high fluid pressure, a certain amount of the fluid leaks past the end of the pipe and into the sealing groove 24. This pressure causes expansion of the ring 39 or causes the ring to compress against the wall of the groove. Pressure also forces the ring 40 snugly against the surface of the pipe preventing leakage therebetween. The reinforcement 40 is sufficient to prevent extrusion of the material forming the ring 39 into the space between the fitting and the pipe. Thus an effective seal is provided between the pipe and the fitting.

Pressure within the fitting also exerts a force against the end of the pipe tending to force the pipe out of the groove. As the jaws grip the pipe more effectively than they engage the wedge-shaped inner surface of the fitting any endwise movement of the pipe tends to wedge the jaws more tightly against the pipe. Thus increase in internal pressure in the fitting actually produces a tighter seal.

Figure 8:
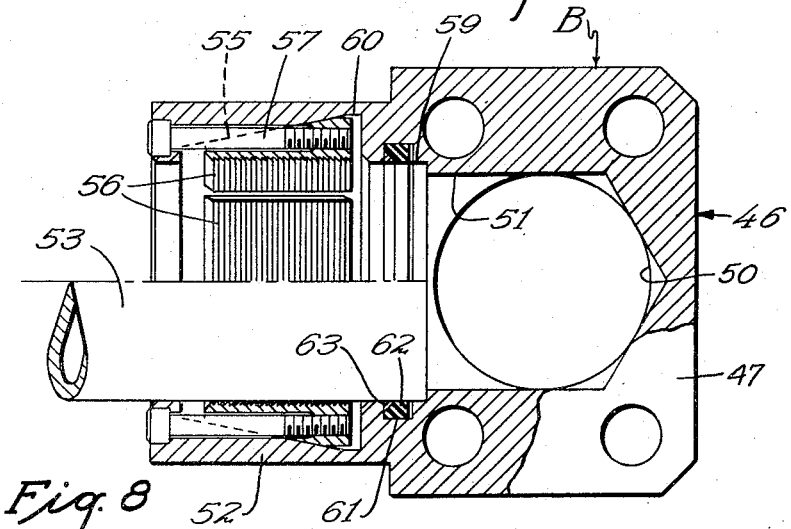
Figure 8 is a partial cross sectional view through a modified form of fitting.
Figure 9:
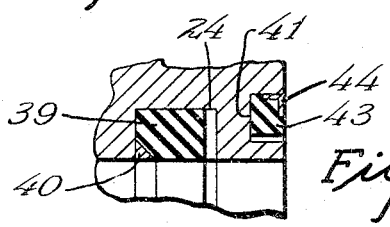
Figure 9 is an enlargement of a part of Figure 1.

In Figure 8 of the drawings I disclose a modified form of coupler, this coupler being indicated in general by the letter B. In theory this coupler is very similar to that previously described but comprises an elbow coupler in which the pipe is secured to extend at right angles to the opening in the housing or other member to which the coupler is secured.

In the construction illustrated in these figures, the fitting B includes a body 46 having a flat surface 47 designed to abut against a pump housing or other element not shown but which is designed to receive fluid under pressure. A passage 50 extends into the body 46 at right angles to the plane of the mounting surface 47. A second bore 51 extends at right angles to the passage 50 and extends through a circular projection 52 forming an integral part of the body 46. The circular projection 52 is designed to accommodate the pipe 53 which is partially illustrated in Figure 8. Thus when the pipe 53 is in place in the fitting, a communication is provided from the interior of the pipe to the passage 50 leading to the connected pump housing not shown.

As is indicated in the drawings, the inner surface of the circular projection 52 is tapered as indicated at 55 to accommodate the angularly spaced jaws 56. These jaws 56 are identical to the jaws 31 previously described. Bolts 57 which are identical to the bolts 29 previously described are employed for moving the jaws toward the outer end of the projection 52. The jaws 56 are internally grooved in the same maner as the previously described jaws 31.

The passage 51 is connected to a larger diameter passage 59 which lies inwardly of the undercut cylindrical portion 60 which forms the end of the tapered portion 55. The passage 59 is provided with a generally rectangular groove 61 in its wall, and the groove 61 accommodates a sealing ring 62. The sealing ring 62 is similar to the sealing ring 39 previously described and is provided with an integral or separate reinforcing ring member 63 of a material which is substantially harder than the material forming the ring 62.

Thus it will be seen that in each of the constructions described the fitting body is provided with a tapered inner surface designed to accommodate a series of angularly spaced jaws. These jaws are tapered similarly to the inner surface of the fitting and some means is provided for urging the jaws against the pipe to provide an initial force thereagainst. When the fitting is subjected to fluid pressure tending to force the pipe from the fitting, movement of the pipe tends to tighten the clamping action of the jaws against the pipe and therefore increasing the effectiveness of the mechanical grip upon the pipe. The seal is interposed between the gripping means and the end of the pipe.

From the foregoing description it will also be seen that the fitting may remain attached to the pipe in the event that it is desired to disconnect the fitting. It is not necessary to unclamp the fitting from the pipe or to disturb the sealing action in view of the construction described.

In accordance with the patent statutes, I have described the principles of construction and operation of my fitting, and while I have endeavored to set forth the best embodiments thereof, I desire to have it understood that obvious changes may be made within the scope of the following claim without departing from the spirit of my invention.

I claim:

A pressure pipe fitting including a hollow fitting body having an inwardly extending integral flange at one end designed to accommodate a pipe therein and a second inwardly extending integral flange at its other end, a portion of said body adjoining said first flange having a tapered inner surface tapering inwardly and toward said second flange and terminating in a small diameter end spaced from both of said flanges, a series of angularly spaced jaws having internal arcuate pipe clamping surfaces and outer tapered surfaces cooperable with the tapered surfaces of said body, said jaws being longitudinally slidable within said body and each having a threaded aperture therein, said second flange having a plurality of apertures therethrough with which said jaw apertures are registrable, a headed bolt received in each flange aperture and having its threaded end extending into a jaw aperture whereby when said bolts are tightened the heads thereof will react against said second flange to pull said jaws in a direction toward said second flange thereby drawing the outer tapered surfaces of said jaws against the tapered inner surface of said body and thus cause said arcuate surfaces to clamp against a pipe inserted therebetween, and a seal within said first flange designed to seal against said inserted pipe.

References Cited in the file of this patent

UNITED STATES PATENTS

| | | |
|---|---|---|
| 303,251 | Almond | Aug. 12, 1884 |
| 792,733 | Scheenherr | June 20, 1905 |
| 899,754 | Murray | Sept. 29, 1908 |
| 1,579,648 | Crickmer | Apr. 6, 1926 |
| 1,818,493 | McWane | Aug. 11, 1931 |
| 2,207,469 | Roye | July 9, 1940 |
| 2,387,610 | Roach | Oct. 23, 1945 |
| 2,458,874 | Parker | Jan. 11, 1949 |
| 2,496,995 | Gorton | Feb. 7, 1950 |
| 2,531,596 | Allen | Nov. 28, 1950 |
| 2,534,199 | Guarnaschelli | Dec. 12, 1950 |
| 2,653,834 | Purkhiser | Sept. 29, 1953 |
| 2,784,015 | Swanson | Mar. 5, 1957 |